United States Patent
McCoy

(10) Patent No.: US 7,454,254 B2
(45) Date of Patent: Nov. 18, 2008

(54) AIRCRAFT CABIN PRESSURE CONTROL SYSTEM AND METHOD FOR REDUCING OUTFLOW VALVE ACTUATOR INDUCED CABIN PRESSURE OSCILLATIONS

(75) Inventor: Gerard L. McCoy, Tucson, AZ (US)

(73) Assignee: Honeywell International, Inc., Morristown, NJ (US)

(*) Notice: Subject to any disclaimer, the term of this patent is extended or adjusted under 35 U.S.C. 154(b) by 560 days.

(21) Appl. No.: 11/215,847

(22) Filed: Aug. 30, 2005

(65) Prior Publication Data

US 2007/0049188 A1    Mar. 1, 2007

(51) Int. Cl.
G05B 13/02    (2006.01)
B64D 13/02    (2006.01)

(52) U.S. Cl. .......................... 700/41; 454/74
(58) Field of Classification Search .................. 700/28, 700/41–43, 301; 454/71, 72, 74
See application file for complete search history.

(56) References Cited

U.S. PATENT DOCUMENTS

| | | | |
|---|---|---|---|
| 3,939,328 A | 2/1976 | Davis | |
| 4,553,474 A | 11/1985 | Wong et al. | |
| 4,702,128 A | 10/1987 | Oshiage | |
| 4,881,160 A | 11/1989 | Sakai et al. | |
| 4,999,557 A | 3/1991 | Inoue | |
| 5,119,304 A | 6/1992 | Seki | |
| 5,155,991 A | 10/1992 | Bruun | |
| 5,186,681 A | 2/1993 | Emmons | |
| 5,270,916 A | 12/1993 | Sexton et al. | |
| 5,297,987 A | 3/1994 | Emmons et al. | |
| 5,520,578 A * | 5/1996 | Bloch et al. | 454/74 |
| 5,598,077 A | 1/1997 | Matsubara et al. | |
| 5,691,616 A | 11/1997 | Iwashita | |
| 5,915,401 A * | 6/1999 | Menard et al. | 137/12 |
| 6,424,873 B1 | 7/2002 | Przybylski | |
| 6,445,980 B1 | 9/2002 | Vyers | |
| 6,650,078 B1 | 11/2003 | Chaffee | |
| 6,676,504 B2 * | 1/2004 | Petri et al. | 454/72 |
| 6,746,322 B2 * | 6/2004 | Scheerer et al. | 454/74 |
| 6,836,091 B2 | 12/2004 | Fujita et al. | |
| 7,101,277 B2 * | 9/2006 | Horner et al. | 454/74 |

* cited by examiner

Primary Examiner—Zoila E Cabrera
(74) Attorney, Agent, or Firm—Oral Caglar, Esq.

(57) ABSTRACT

A cabin pressure control system and method that reduces or inhibits gear train backlash and the concomitant cabin pressure oscillations associated therewith. The cabin pressure control system includes a variable proportional-integral (PI) controller that implements a proportional function with a variable gain term and an integrator function with variable saturation limit. The proportional function gain term is increased, and the integrator saturation limits are decreased, at relatively low cabin error rate magnitudes. Increasing the proportional function gain term at relatively low cabin error rate magnitudes offsets potential backlash effects from the gear train. Decreasing the integrator saturation limits at relatively low cabin rate error magnitudes reduces potentially excessive integrator wind-up levels, which reduces the likelihood of producing limit-cycling and the potential for cabin pressure oscillations.

14 Claims, 3 Drawing Sheets

AIRCRAFT CABIN PRESSURE CONTROL SYSTEM AND METHOD FOR REDUCING OUTFLOW VALVE ACTUATOR INDUCED CABIN PRESSURE OSCILLATIONS

TECHNICAL FIELD

The present invention relates to aircraft cabin pressure control and, more particularly, to a system and method for reducing actuator induced cabin pressure oscillations.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin altitude," which refers to the normal atmospheric pressure existing at a certain altitude. Studies have shown that the symptoms of hypoxia may become noticeable when the cabin altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin altitude to minimize passenger discomfort.

To accomplish the above functions, some cabin pressure control systems implement control laws that use cabin pressure rate of change as an input. In many of these systems, the cabin pressure rate of change is sensed, either using an analog or a digital pressure, and compared to a desired cabin pressure rate of change to determine a "rate error." The rate error may then be used in the control laws to drive a motor or other actuator, which in turn moves an outflow valve, via a suitable gear train, to a position that causes the cabin pressure to vary at the desired cabin pressure rate of change.

In some cabin pressure control systems that implement the above-described functionality, the gear train may exhibit backlash during certain operating conditions. This backlash may, in some instances, cause noticeable cabin pressure oscillations, which are a source of dissatisfaction with most aircraft operators and passengers.

Hence, there is a need for a cabin pressure control system and method that reduces or inhibits gear train backlash sufficiently, so that concomitant cabin pressure oscillations are reduced or inhibited. The present invention addresses at least this need.

BRIEF SUMMARY

The present invention provides a cabin pressure control system and method that reduces or inhibits gear train backlash and the concomitant cabin pressure oscillations associated therewith.

In one embodiment, and by way of example only, an aircraft cabin pressure control system controller circuit includes a comparator and a variable proportional-integral (PI) controller. The comparator is configured to receive a cabin pressure rate-of-change command signal and a sensed cabin pressure rate-of-change signal and is operable, in response thereto, to supply a cabin rate error signal representative of a difference between the cabin pressure rate-of-change command signal and the sensed cabin pressure rate-of-change signal. The variable PI controller includes a proportional function and an integrator function, is coupled to receive the cabin rate error signal and is operable, in response thereto, to generate an actuator command signal. The proportional function has a variable gain term, and the integrator function has a variable upper saturation limit and a variable lower saturation limit. The variable PI controller is further operable, upon receipt of the cabin rate error signal, to vary the proportional function gain term, the integrator function upper saturation limit, and the integrator function lower saturation limit.

In another exemplary embodiment, an aircraft cabin pressure control system includes a cabin pressure sensor and a control unit. The cabin pressure sensor is configured to sense aircraft cabin pressure and supply a cabin pressure signal representative thereof. The control unit is coupled to receive the cabin pressure signal and one or more signals representative of aircraft operational mode and is operable, in response thereto, to supply actuator control signals. The control unit includes a rate circuit, a comparator, and a variable PI controller. The rate circuit is coupled to receive the cabin pressure signal and is operable, in response thereto, to supply a signal representative of sensed cabin pressure rate-of-change. The comparator is configured to receive a cabin pressure rate-of-change command signal and the sensed cabin pressure rate-of-change signal and is operable, in response thereto, to supply a cabin rate error signal representative of a difference between the cabin pressure rate-of-change command signal and the sensed cabin pressure rate-of-change signal. The variable PI controller includes a proportional function and an integrator function, is coupled to receive the cabin rate error signal and is operable, in response thereto, to generate an actuator command signal. The proportional function has a variable gain term, and the integrator function has a variable upper saturation limit and a variable lower saturation limit. The variable PI controller is further operable, upon receipt of the cabin rate error signal, to vary the proportional function gain term, the integrator function upper saturation limit, and the integrator function lower saturation limit.

In yet another exemplary embodiment, a method of generating aircraft cabin pressure control system outflow valve actuator control signals includes comparing a commanded cabin pressure rate-of-change command and an actual cabin pressure rate-of-change signal to determine a cabin rate error. A proportional function gain term is selectively varied based on the cabin rate error, and an integrator function upper saturation limit and lower saturation limit are selectively varied based on the cabin rate error. The cabin rate error is processed through the proportional function to determine a proportional cabin rate error that is proportional to the gain term, and through the integrator function to determine an integrated cabin rate error that is not greater than the upper saturation limit or less than the lower saturation limit. The actuator control signals are generated from the proportional cabin rate error and the integrated cabin rate error.

Other independent features and advantages of the preferred cabin pressure control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the description, it is to be appreciated that the following detailed description is merely exemplary in nature and is not intended to limit the invention or the application and uses of the invention. Furthermore, there is no intention to be bound by any theory presented in the preceding background or the following detailed description.

Figure 1:
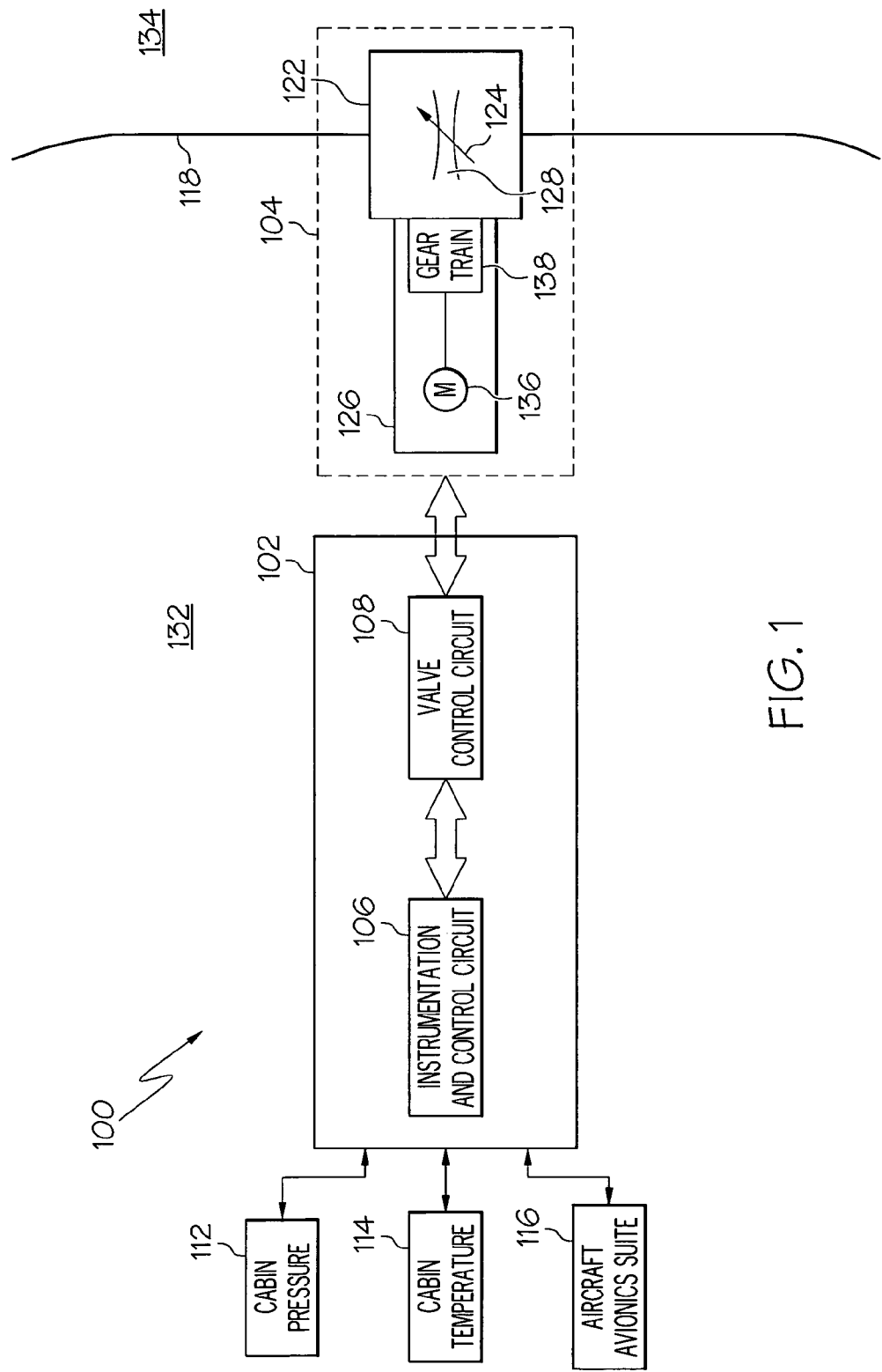
FIG. 1 is a functional block diagram of an aircraft cabin pressure control system according to an embodiment of the present invention.

Turning now to FIG. 1, a functional block diagram of an exemplary aircraft cabin pressure control system 100, and its interconnections to certain other aircraft systems, is shown. In the depicted embodiment, the system 100 includes a control unit 102 and an outflow valve 104. Although not depicted, it will be appreciated that the system 100 may additionally include one or more overpressure relief valves, and one or more negative pressure relief valves. These valves are typically included as part of an aircraft cabin pressure control system but, for clarity and ease of illustration and depiction, are not shown or further described herein. Moreover, before proceeding further with the description of the system 100, it is noted that the depicted embodiment is merely exemplary and that the system 100 could be implemented with two or more independent control units 102, and two or more outflow valves 104.

The control unit 102 includes an instrumentation and control circuit 106 and a valve control circuit 108. The instrumentation and control circuit 106 is coupled to receive signals from a plurality of sensors and other signal sources. In the depicted embodiment, the sensors include a cabin pressure sensor 112, and a cabin temperature sensor 114. It will be appreciated that the sensors 112, 114 depicted and described herein are merely exemplary, and that the system 100 could be implemented with additional or different types of sensors. For example, the system 100 could additionally include one or more atmosphere pressure sensors and/or one or more cabin-to-atmosphere differential pressure sensors.

The cabin pressure sensor 112 is disposed and configured to sense absolute cabin pressure, and is preferably implemented as any one of numerous types of analog pressure sensors. Some non-limiting examples of suitable analog pressure sensors include various semiconductor diaphragm pressure sensors, various capacitance pressure sensors, various optical sensors, and various magnetic sensors. In a particular preferred embodiment, however, the cabin pressure sensor 112 is implemented as a piezoelectric strain gauge sensor.

The cabin temperature sensor 114 is disposed and configured to sense cabin temperature, and is also preferably implemented as any one of numerous types of analog temperature sensors. Some non-limiting examples of suitable temperature sensors include resistance temperature detectors (RTDs), thermocouples, and various types of optical temperature sensors. In a particular preferred embodiment, the cabin temperature sensor 114 is implemented as a RTD. It will be appreciated that the temperature sensor 114 may be omitted in some embodiments. However, the cabin temperature sensor 114, when included, is used to correct the absolute pressure value sensed by the cabin pressure sensor 112 for environmental temperature changes.

The instrumentation and control circuit 106 also communicates with, and receives signals from, the aircraft avionics suite 116 via, for example, ARINC-429, analog, and/or discrete input/output signals. Based on the signals received from the avionics suite 116, as well as signals supplied from the sensors 112, 114, the instrumentation and control circuit 106 computes a desired (or commanded) cabin pressure rate-of-change, an actual (or sensed) cabin pressure rate-of-change, temperature corrected cabin pressure, supplies appropriate actuation control signals to the valve control circuit 108, and additionally supplies various alarm, indication, warning, and/or control signals.

The valve control circuit 108 receives the actuation control signals supplied from the instrumentation and control circuit 106. In response to the actuation control signals, which preferably include speed or duty cycle command information and direction information, the valve control circuit 108 supplies valve command signals to the outflow valve 104, to thereby control the position of the outflow valve 104, and thereby modulate cabin pressure.

The outflow valve 104 is preferably mounted on an aircraft bulkhead 118, and includes a valve body 122, a valve element 124, and a valve actuator 126. The valve body 122 has a flow passage 128 that extends through it, such that when the outflow valve 104 is mounted on the aircraft bulkhead 118, the flow passage 128 is in fluid communication with the aircraft cabin 132 and the external atmosphere 134. The valve element 124 is movably mounted on the valve body 122 and extends into the flow passage 128. The valve element 124 is movable between an open position, in which the aircraft cabin 132 and the external atmosphere 134 are in fluid communication, and a closed position, in which the aircraft cabin 132 is sealed from the external atmosphere.

The valve actuator 126 is coupled to the valve element 124 and positions the valve element 124 to a commanded position, to thereby control cabin pressure. To do so, the valve actuator 126 is coupled to receive the valve command signals supplied by the valve control circuit 108. In response to the supplied valve command signals, the valve actuator 126 moves the valve element 124 to the commanded position. It will be appreciated that the valve actuator 126 may be implemented as any one of numerous types of actuators, but in the depicted embodiment the valve actuator 126 is implemented with a motor 136 and a suitable gear train 138.

Figure 2:
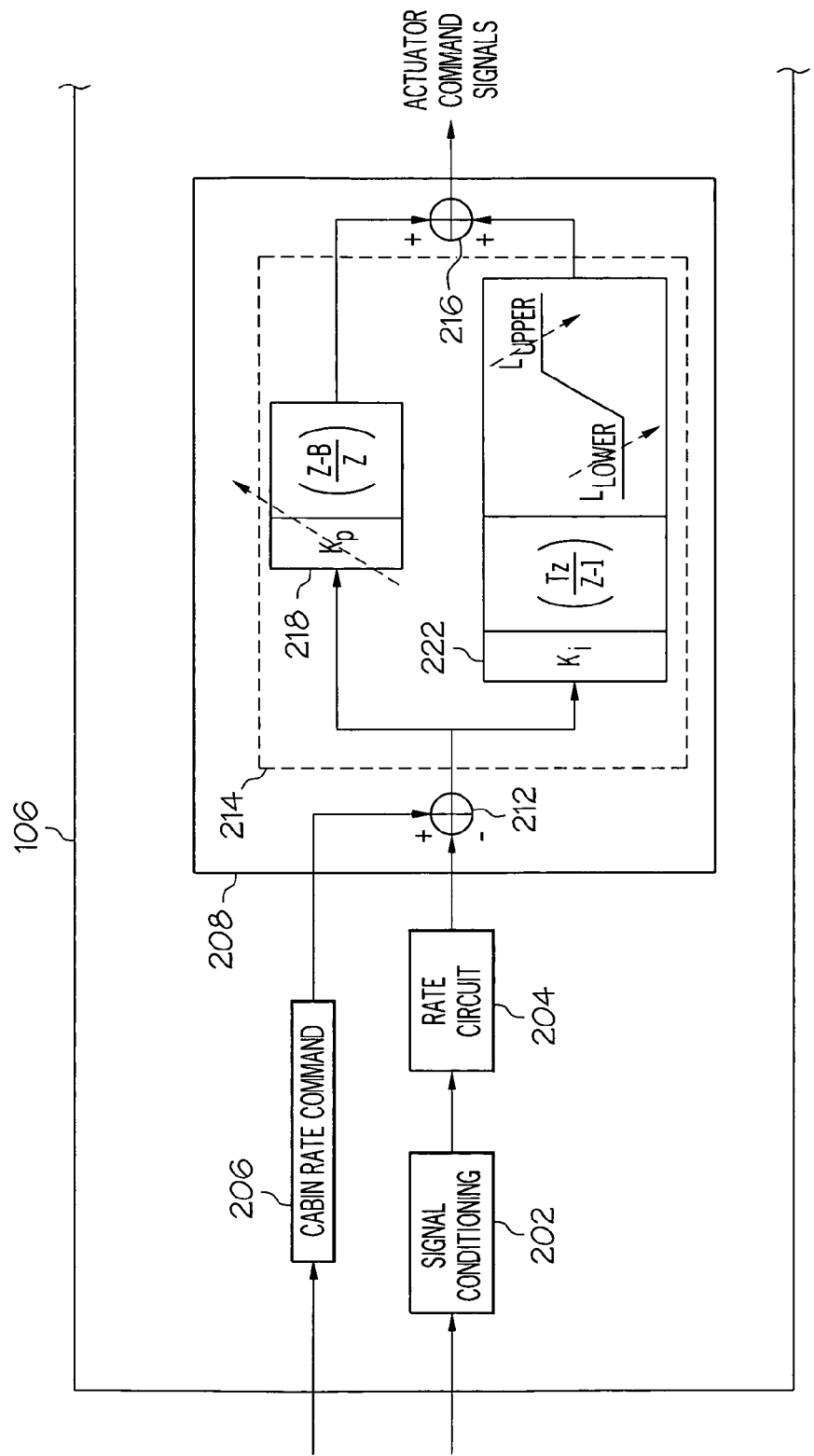
FIG. 2 is a functional block diagram of a portion of an instrumentation and control circuit that may be included in the system of FIG. 1.

Turning now to FIG. 2, a more detailed description of a portion of the instrumentation and control circuit 106 will be provided. As FIG. 2 illustrates, the instrumentation and control circuit 106, at least in the depicted embodiment, includes a pressure signal conditioning circuit 202, a rate circuit 204, a cabin rate command circuit 206, and a controller circuit 208. The pressure signal conditioning circuit 202 receives the pressure signals supplied by the cabin pressure sensor 112 and properly conditions and filters the pressure signal for further processing. The pressure signal conditioning circuit 202 may be implemented using any one of numerous circuit topologies and may include any one of numerous types of circuits. For example, the pressure signal conditioning circuit 202 may include, as appropriate, a filter and an amplifier circuit with slope and offset compensation circuitry, which supplies an analog cabin pressure signal that is proportional to the sensed cabin pressure ($P_C$). The pressure signal conditioning circuit 202 may additionally include, as appropriate, an analog-to-digital converter (A/D) circuit that, in a conventional manner, samples the analog cabin pressure signal at a predetermined sampling frequency and supplies digital cabin pressure signals representative of the analog cabin pressure signal.

The rate circuit 204 receives the conditioned and filtered cabin pressure signals (either analog or digital) from the signal conditioning circuit 202 and, in response, determines the sensed cabin pressure rate-of-change and supplies a sensed cabin pressure rate-of-change signal representative thereof to the controller circuit 208. The rate circuit 204 may be implemented using any one of numerous circuit topologies and may include any one of numerous types of circuits for determining the cabin pressure rate-of-change. For example, the rate circuit 204 may be implemented using one or more analog filter circuits or one or more digital filter circuits. Preferably, the rate circuit 204 determines the cabin pressure rate-of-change by implementing a digital filter circuit.

The cabin rate command circuit 206 is coupled to receive one or more signals supplied from the avionics suite 116, and may additionally receive signals supplied from one or more sensors, including the cabin pressure and temperature sensors 112, 114. The signals from the avionics suite 116 and one or more of the sensor signals are representative of the operational mode of the aircraft. In response to the received signals, the cabin rate command circuit 206 determines the aircraft operational mode and, based on the determined operational mode, a desired cabin pressure rate-of-change. The cabin rate command circuit 206 additionally supplies a cabin pressure rate-of-change command signal, representative of the desired cabin pressure rate-of-change, to the controller circuit 208. As with the other circuits previously described, the cabin rate command circuit 206 may be implemented using any one of numerous circuit topologies and may include any one of numerous types of circuits for determining the desired cabin pressure rate-of-change. For example, the cabin rate command circuit 206 may be implemented using one or more analog circuits or one or more digital circuits. Preferably, the cabin rate command circuit 206 is implemented digitally.

The controller circuit 208 receives the cabin pressure rate-of-change command signal and the sensed cabin pressure rate-of-change signal and, in response, generates the actuator command signals that are supplied to the valve control circuit 108. The controller circuit 208 is preferably implemented using a comparator 212, a variable proportional-integral (PI) controller 214, and an adder 216. The comparator 212 receives the cabin pressure rate-of-change command signal and the sensed cabin pressure rate-of-change signal from the cabin rate command circuit 206 and the rate circuit 204, respectively. In response to these signals, the comparator 212 supplies a cabin rate error signal that is representative of the difference between the commanded pressure rate-of-change and the sensed cabin pressure rate-of-change.

The PI controller 214 receives the cabin rate error signal from the comparator 212 and, in response, generates the actuator command signals. To do so, the variable PI controller 214 includes a proportional function 218 and an integrator function 222. The proportional function 218 includes a variable gain term ($K_p$) and is preferably implemented with phase-lead, and thus additionally includes a phase lead term $$\left(\frac{z-b}{z}\right).$$

The integrator function 222 includes a constant gain term ($K_i$), an integrator term $$\left(\frac{Tz}{z-1}\right),$$

and variable upper and lower saturation limits ($L_{upper}$, $L_{lower}$) The proportional function 218 and the integrator function 222 each receive the rate error signal supplied from the comparator 212 and supply signals to the adder 216, which in turn supplies the actuator command signals. More specifically, the proportional function 218, in response to the rate error signal, supplies a proportional rate error signal to the adder 216 that is proportional to the variable gain term ($K_p$), and the integrator function 222, in response to the rate error signal, supplies an integrated rate error signal to the adder 216 having a value that is not above the variable upper saturation limit ($L_{upper}$) or below the variable lower saturation limit ($L_{lower}$). The adder 216, upon receipt of the proportional rate error signal and the integrated rate error signal, adds the two signals together and supplies the actuator command signals.

Figure 3:
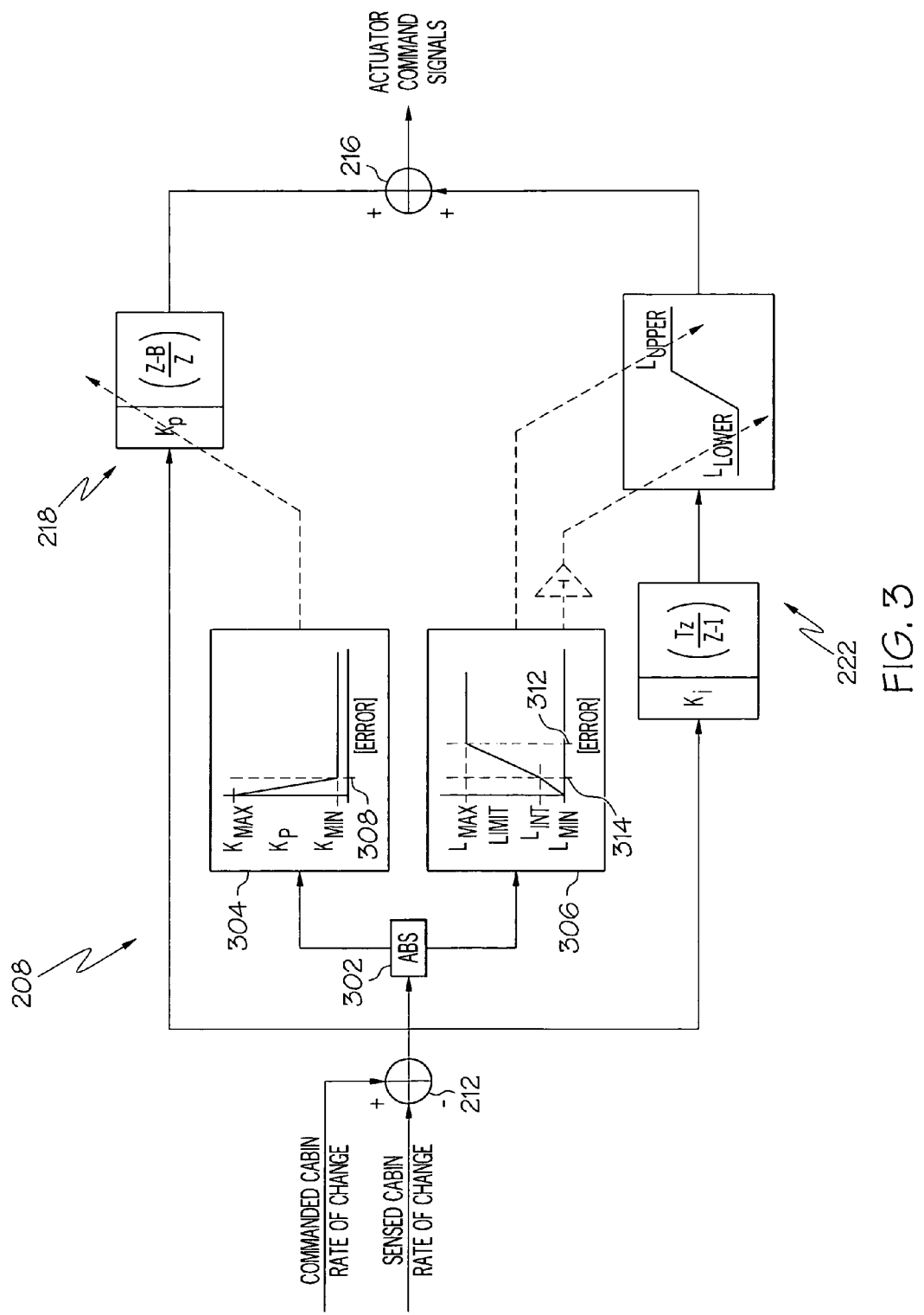
FIG. 3 is a functional block diagram of a controller circuit that may be implemented in the circuit of FIG. 2.

The variable PI controller 214 is configured to vary the proportional function gain term ($K_p$) and the integrator function upper and lower saturation limits ($L_{upper}$, $L_{lower}$) based on the magnitude of the cabin rate error. More specifically, and with reference now to FIG. 3, it is seen that the controller circuit 208 further includes an absolute value determination function 302. The absolute value determination function 302 also receives the rate error signal supplied from the comparator 212 and determines the magnitude (e.g., the absolute value) of the cabin rate error (|error|).

The proportional function 218 and the integrator function 222, in addition to the functions described above, are responsive to the determined cabin rate error magnitude to selectively vary the proportional gain term ($K_p$) and the saturation limits ($L_{upper}$, $L_{lower}$), respectively. More specifically, the proportional function 218 implements a proportional gain term ($K_p$) versus cabin rate error magnitude (|error|) function 304, and the integrator function 222 implements a saturation limit magnitude (|$L_{limit}$|) versus cabin rate error magnitude (|error|) function 306. As the proportional gain versus cabin rate error magnitude function 304 depicts, the proportional gain term ($K_p$) is varied only when the cabin rate error magnitude is between zero and a first predetermined error magnitude 308. More specifically, when the cabin rate error magnitude is between zero and the first predetermined magnitude 308, the proportional gain term ($K_p$) is varied between a maximum gain value ($K_{max}$) and a minimum gain value ($K_{min}$). Preferably, the proportional gain term ($K_p$) is varied between the maximum gain value ($K_{max}$) and the minimum gain value ($K_{min}$) as a function of cabin rate error magnitude, and even more preferably as a linear function of cabin rate error magnitude. As FIG. 3 additionally shows, when the cabin rate error magnitude is above the first predetermined error magnitude 308, the proportional gain term ($K_p$) is maintained at a constant value, which in the depicted embodiment is the minimum gain value ($K_{min}$).

Similar to the proportional gain term versus cabin rate error magnitude function 304, the saturation limit magnitude versus cabin rate error magnitude function 306 varies the saturation limits ($L_{upper}$, $L_{lower}$) only when the cabin rate error magnitude is between zero and a second predetermined error magnitude 312. The second predetermined error magnitude 312, at least in the depicted embodiment, is greater than the first predetermined error magnitude 308. It will be appreciated, however, that this is merely exemplary of a particular embodiment, and that the first and second predetermined error magnitudes 308, 312 could be equal, or the first predetermined error magnitude 308 could be greater than the second predetermined error magnitude 312. Moreover, the specific values for the first and second predetermined magnitudes 308, 312 may vary from system to system to meet desired operational requirements.

No matter the specific and relative values of the first and second predetermined error magnitudes, it is seen that when the cabin rate error magnitude is between zero and the second predetermined magnitude 312, the upper and lower saturation limit magnitudes ($L_{upper}$, $L_{lower}$) are varied between a minimum limit magnitude ($L_{min}$) and a maximum limit magnitude ($L_{max}$). In addition, when the cabin rate error magnitude is greater than the second predetermined magnitude 312, the upper and lower saturation limit magnitudes ($L_{upper}$, $L_{lower}$) are maintained at constant magnitudes, which in the depicted embodiment is the maximum limit magnitude ($L_{max}$).

More specifically, at least in the depicted embodiment, when the cabin rate error magnitude is between zero and a third predetermined magnitude 314, which is less than the second predetermined magnitude 312, the upper and lower saturation limit magnitudes ($L_{upper}$, $L_{lower}$) are preferably varied between the minimum saturation limit magnitude ($L_{min}$) and an intermediate saturation limit magnitude ($L_{int}$) as a first function of cabin rate error magnitude. When the cabin rate error magnitude is between the third predetermined magnitude 314 and the second predetermined magnitude 312, the upper and lower saturation limit magnitudes ($L_{upper}$, $L_{lower}$) are preferably varied between the intermediate saturation limit magnitude ($L_{int}$) and the maximum saturation limit magnitude ($L_{max}$) as a second function of the cabin rate error. Even more preferably, the upper and lower saturation limit magnitudes ($L_{upper}$, $L_{lower}$) are varied linearly between the minimum saturation limit magnitude ($L_{min}$) and the intermediate saturation limit magnitude ($L_{int}$) as a first function of cabin rate error magnitude, and are varied linearly between the intermediate saturation limit magnitude ($L_{int}$) and the maximum saturation limit magnitude ($L_{max}$) as a second function of the cabin rate error.

With the above-described implementation, it is seen that the proportional gain term ($K_p$) is increased, and the integrator saturation limits ($L_{upper}$, $L_{lower}$) are decreased, at relatively low cabin error rate magnitudes. Increasing the proportional gain term ($K_p$) at relatively low cabin error rate magnitudes aids in driving the actuator motor 136 through reversals in commanded direction in a relatively quick manner, which in turn aids in offsetting potential backlash effects from the gear train 138. Decreasing the integrator saturation limits ($L_{upper}$, $L_{lower}$) at relatively low cabin rate error magnitudes reduces the output of the integrator function 222. As a result, potentially excessive integrator wind-up levels do not have to be unwound, which reduces the likelihood of producing limit-cycling and the potential for cabin pressure oscillations.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft cabin pressure control system controller circuit, comprising:

a comparator configured to receive a cabin pressure rate-of-change command signal and a sensed cabin pressure rate-of-change signal and operable, in response thereto, to supply a cabin rate error signal representative of a difference between the cabin pressure rate-of-change command signal and the sensed cabin pressure rate-of-change signal; and a variable gain proportional-integral (PI) controller coupled to receive the cabin rate error signal and operable, in response thereto, to generate an actuator command signal and determine a magnitude of the cabin rate error, the variable gain PI controller including a proportional function and an integrator function, the proportional function having a variable gain term, the integrator function having a variable upper saturation limit and a variable lower saturation limit, the variable gain PI controller further operable, upon receipt of the cabin rate error signal, to vary the proportional function gain term between a maximum gain value and a minimum gain value when the cabin rate error magnitude is between zero and a first predetermined magnitude, to vary the integrator function upper and lower saturation limits between minimum and maximum saturation limit magnitudes when the cabin rate error magnitude is between zero and a second predetermined magnitude and maintains the integrator function upper and lower saturation limits at the maximum saturation limit magnitude when the cabin rate error magnitude is above the second predetermined magnitude, to vary the integrator function upper and lower saturation limit magnitudes between the minimum saturation limit magnitude and an intermediate saturation limit magnitude as a first function of cabin rate error magnitude when the cabin rate error magnitude is between zero and a third predetermined magnitude that is less than the second predetermined magnitude, and to vary the integrator function upper and lower saturation limits between the intermediate saturation limit magnitude and the maximum saturation limit magnitude as a second function of cabin rate error magnitude when the cabin rate error magnitude is between the third predetermined magnitude and the second predetermined magnitude.

2. The controller of claim 1, wherein:

the proportional function receives the cabin rate error signal and supplies a proportional rate error signal that is proportional to the gain term;

the integrator function receives the cabin rate error signal and supplies an integral rate error signal having a value that is not above the upper saturation limit or below the lower saturation limit; and the PI controller further includes an adder, the adder coupled to receive the proportional rate error signal and the integral rate error signal and operable, in response thereto, to add the proportional rate error signal and the integral rate error signal, and thereby generate the actuator command signal.

3. The control circuit of claim 1, wherein the variable gain PI controller:

varies the proportional function gain term between the maximum gain value and the minimum gain value as a function of cabin rate error magnitude when the cabin rate error magnitude is between zero and the first predetermined magnitude; and maintains the proportional function gain term at the minimum gain value when the cabin rate error magnitude is above the first predetermined magnitude.

4. The controller circuit of claim 3, wherein the variable gain PI controller varies the proportional function gain term linearly as a function of cabin rate error magnitude when the cabin rate error magnitude is between zero and the first predetermined magnitude.

5. The controller circuit of claim 1, wherein the variable gain PI controller:

varies the integrator function upper and lower saturation limits linearly between the minimum saturation limit magnitude and the intermediate saturation limit magnitude as a first function of cabin rate error magnitude when the cabin rate error magnitude is between zero and the third predetermined magnitude; and varies the integrator function upper and lower saturation limits linearly between the intermediate saturation limit magnitude and the maximum saturation limit magnitude as a second function of cabin rate error magnitude when the cabin rate error magnitude is between the third predetermined magnitude and the second predetermined magnitude.

6. The controller circuit of claim 1, further comprising:

an absolute value determination function coupled to receive the cabin rate error signal and operable, in response thereto, to determine the magnitude of the cabin rate error and supply a signal representative thereof to the proportional function and the integrator function.

7. The controller circuit of claim 1, wherein the proportional function includes a phase lead term.

8. An aircraft cabin pressure control system, comprising:

a cabin pressure sensor configured to sense aircraft cabin pressure and supply a cabin pressure signal representative thereof; and a control unit coupled to receive the cabin pressure signal and one or more signals representative of aircraft operational mode and operable, in response thereto, to supply actuator control signals, the controller circuit including:

a rate circuit coupled to receive the cabin pressure signal and operable, in response thereto, to supply a signal representative of sensed cabin pressure rate-of-change, a comparator configured to receive a cabin pressure rate-of-change command signal and the sensed cabin pressure rate-of-change signal and operable, in response thereto, to supply a cabin rate error signal representative of a difference between the cabin pressure rate-of-change command signal and the sensed cabin pressure rate-of-change signal, and a variable gain proportional-integral (PI) controller coupled to receive the cabin rate error signal and operable, in response thereto, to generate the actuator control signals and determine a magnitude of the cabin rate error, the variable gain PI controller including a proportional function and an integrator function, the proportional function having a variable gain term including a phase lead term defined by $((z-b)/z)$, the integrator function having an integrator term defined by $(Tz/(z-1))$, a variable upper saturation limit and a variable lower saturation limit, the variable gain PI controller further operable, upon receipt of the cabin rate error signal, to vary the proportional function gain term, between a maximum gain value and a minimum gain value only when the cabin rate error magnitude is between zero and a first predetermined magnitude, to vary the integrator function upper and lower saturation limits between minimum and maximum saturation limit magnitudes only when the cabin rate error magnitude is between zero and a second predetermined magnitude, to maintain the integrator function upper and lower saturation limits at the maximum saturation limit magnitude when the cabin rate error magnitude is above the second predetermined magnitude, to vary the integrator function upper and lower saturation limit magnitudes between the minimum saturation limit magnitude and an intermediate saturation limit magnitude as a first function of cabin rate error magnitude when the cabin rate error magnitude is between zero and a third predetermined magnitude that is less than the second predetermined magnitude, and to vary the integrator function upper and lower saturation limits between the intermediate saturation limit magnitude and the maximum saturation limit magnitude as a second function of cabin rate error magnitude when the cabin rate error magnitude is between the third predetermined magnitude and the second predetermined magnitude.

9. The system of claim 8, wherein the control unit further comprises a cabin rate command circuit, the cabin rate command circuit coupled to receive the one or more signals representative of aircraft operational mode and operable, in response thereto, to supply the cabin pressure rate-of-change command signal.

10. The system of claim 8, wherein:

the control circuit further comprises a valve control circuit, the valve control circuit coupled to receive the actuator control signals and operable, in response thereto, to supply outflow valve command signals; and the system further comprises an outflow valve coupled to receive the outflow valve command signals and operable, in response thereto, to selectively move between an open and a closed position, to thereby modulate aircraft cabin pressure.

11. A method of generating aircraft cabin pressure control system outflow valve actuator control signals, comprising the steps of:

comparing a commanded cabin pressure rate-of-change command and an actual cabin pressure rate-of-change signal to determine a magnitude of a cabin rate error;

selectively varying a proportional function gain term between a maximum gain value and a minimum gain value only when the cabin rate error magnitude is between zero and a first predetermined magnitude;

selectively varying an integrator function upper saturation limit and lower saturation limit between minimum and maximum saturation limit magnitudes only when the cabin rate error magnitude is between zero and a second predetermined magnitude;

maintaining the integrator function upper and lower saturation limits at the maximum saturation limit magnitude when the cabin rate error magnitude is above the second predetermined magnitude;

varying the integrator function upper and lower saturation limit magnitudes between the minimum saturation limit magnitude and an intermediate saturation limit magnitude as a first function of cabin rate error magnitude when the cabin rate error magnitude is between zero and a third predetermined magnitude that is less than the second predetermined magnitude;

varying the integrator function upper and lower saturation limits between the intermediate saturation limit magnitude and the maximum saturation limit magnitude as a second function of cabin rate error magnitude when the cabin rate error magnitude is between the third predetermined magnitude and the second predetermined magnitude;

processing the cabin rate error through the proportional function to determine a proportional cabin rate error that is proportional to the gain term;

processing the cabin rate error through the integrator function to determine an integrated cabin rate error that is not greater than the upper saturation limit or less than the lower saturation limit; and generating the actuator control signals from the proportional cabin rate error and the integrated cabin rate error.

12. The method of claim 11, further comprising:

adding the proportional rate error and the integral rate error to thereby generate the actuator control signals.

13. The method of claim 11, further comprising:

linearly varying the proportional function gain term between the maximum gain value and the minimum gain value as a function of cabin rate error magnitude when the cabin rate error magnitude is between zero and the first predetermined magnitude; and maintaining the proportional function gain term at the minimum gain value when the cabin rate error magnitude is above the first predetermined magnitude.

14. The method of claim 11, further comprising:

linearly varying the integrator function upper and lower saturation limits between the minimum saturation limit magnitude and the maximum saturation limit magnitude when the cabin rate error magnitude is between zero and the second predetermined magnitude.

* * * * *